(12) United States Patent
Boström et al.

(10) Patent No.: US 8,912,284 B2
(45) Date of Patent: *Dec. 16, 2014

(54) POLYMER COMPOSITION HAVING IMPROVED WET AGEING PROPERTIES

(75) Inventors: Jan-Ove Boström, Oedsmaal (SE); Annika Smedberg, Myggenaes (SE)

(73) Assignee: Borealis Technology Oy, Porvoo (FI)

( * ) Notice: Subject to any disclaimer, the term of this patent is extended or adjusted under 35 U.S.C. 154(b) by 1703 days.

This patent is subject to a terminal disclaimer.

(21) Appl. No.: 11/916,886

(22) PCT Filed: Jun. 1, 2006

(86) PCT No.: PCT/EP2006/005247
§ 371 (c)(1),
(2), (4) Date: Aug. 1, 2008

(87) PCT Pub. No.: WO2006/131265
PCT Pub. Date: Dec. 14, 2006

(65) Prior Publication Data
US 2009/0029166 A1   Jan. 29, 2009

(30) Foreign Application Priority Data
Jun. 8, 2005  (EP) .................... 05012353

(51) Int. Cl.
| | | |
|---|---|---|
| *C08L 23/08* | (2006.01) | |
| *C08L 33/06* | (2006.01) | |
| *C08L 33/08* | (2006.01) | |
| *C08L 33/10* | (2006.01) | |
| *C08L 47/00* | (2006.01) | |
| *C08L 23/02* | (2006.01) | |
| *B32B 27/06* | (2006.01) | |
| *B32B 27/26* | (2006.01) | |
| *B32B 27/32* | (2006.01) | |

(52) U.S. Cl.
CPC ............. *C08L 23/025* (2013.01); *B32B 27/06* (2013.01); *B32B 27/26* (2013.01); *B32B 27/32* (2013.01); *C08L 23/083* (2013.01); *C08L 23/0869* (2013.01); *B32B 2307/20* (2013.01); *B32B 2307/712* (2013.01); *B32B 2597/00* (2013.01); *C08L 23/02* (2013.01)
USPC ........... 525/222; 525/227; 525/232; 525/240; 525/330.3; 525/332.1; 525/332.8; 524/556; 524/562; 524/563; 524/570; 428/500; 428/521; 428/522; 428/523

(58) Field of Classification Search
USPC ......... 525/206, 221, 222, 209, 227, 232, 240, 525/330.3, 332.1, 332.8; 524/556, 562, 524/563, 570; 428/500, 521, 522, 523
See application file for complete search history.

(56) References Cited

U.S. PATENT DOCUMENTS

| | | | |
|---|---|---|---|
| 4,305,849 A | | 12/1981 | Kawasaki et al. |
| 4,438,162 A | * | 3/1984 | Nelson ..................... 427/318 |
| 4,812,505 A | | 3/1989 | Topcik |
| 5,292,845 A | * | 3/1994 | Kawasaki et al. ............ 526/336 |
| 5,321,080 A | * | 6/1994 | Kumano et al. ................. 525/79 |
| 5,539,075 A | * | 7/1996 | Gustafsson et al. .......... 526/339 |
| 5,814,714 A | * | 9/1998 | Palomo et al. ................ 526/336 |
| 7,803,860 B2 | * | 9/2010 | Smedberg et al. ............ 524/313 |
| 2003/0040582 A1 | | 2/2003 | Braga et al. .................... 525/238 |
| 2010/0292404 A1 | * | 11/2010 | Hampton et al. ............. 525/191 |
| 2011/0061893 A1 | * | 3/2011 | Smedberg et al. ...... 174/120 SR |

FOREIGN PATENT DOCUMENTS

| | | |
|---|---|---|
| WO | 8505216 | 11/1985 |
| WO | 9212182 | 7/1992 |
| WO | 9308222 | 4/1993 |
| WO | 9635732 | 11/1996 |
| WO | WO 96/35732 | * 11/1996 |
| WO | 9931675 | 6/1999 |

* cited by examiner

*Primary Examiner* — Roberto Rabago
(74) *Attorney, Agent, or Firm* — Roberts Mlotkowski Safran & Cole, P.C.

(57) ABSTRACT

The present invention relates to a crosslinkable polymer composition, comprising (i) an unsaturated polyolefin having a total amount of carbon-carbon double bonds/1000 carbon atoms of more than 0.37, and (ii) a polar copolymer.

32 Claims, No Drawings

POLYMER COMPOSITION HAVING IMPROVED WET AGEING PROPERTIES

The present invention relates to a polymer composition with improved wet ageing properties, especially improved water tree resistance properties, and improved crosslinking properties, and a multi-layered article such as a power cable comprising the polymer composition.

A typical electric power cable generally comprises one or more conductors in a cable core that is surrounded by several layers of polymeric materials including an inner semiconducting layer, followed by an insulating layer, and then an outer semiconducting layer. These layers are normally crosslinked. To these layers, further layers may be added, such as a metallic tape or wire shield, and finally a jacketing layer. The layers of the cable are based on different types of polymers. Nowadays, low density polyethylene, crosslinked by adding peroxide compounds, is the predominant cable insulation material.

A limitation of polyolefins is their tendency to be exposed, in the presence of water and under the action of strong electric fields, to the formation of bush-shaped defects, so-called water trees, which can lead to lower breakdown strength and possibly electric failure. This tendency is strongly affected by the presence of inhomogeneities, microcavities and impurities in the material. Water treeing is a phenomenon that has been studied carefully since the 1970's.

In electrically strained polymer materials, subjected to the presence of water, processes can occur which are characterized as "water treeing". It is known that insulated cables suffer from shortened service life when installed in an environment where the polymer is exposed to water, e.g. under ground or at locations of high humidity.

The appearance of water tree structures are manifold. In principle, it is possible to differentiate between two types:
  "Vented trees" which have their starting point on the surface of the material extending into the insulation material and
  "Bow-tie trees" which are formed within the insulation material.

The water tree structure constitutes local damage leading to reduced dielectric strength.

Common polymeric materials for wire and cable applications are preferably made from polyethylene homopolymers, ethylene-propylene-elastomers, otherwise known as ethylene-propylene-rubber (EPR), or polypropylene.

Polyethylene is generally used without a filler as an electrical insulation material as it has good dielectric properties, especially high breakdown strength and low power factor. However, polyethylene homopolymers are prone to "water-treeing" when water is present.

Many solutions have been proposed for increasing the resistance of insulating materials to degradation by water-treeing. One solution involves the addition of polyethylene glycol, as water-tree growth inhibitor to a low density polyethylene such as described in U.S. Pat. No. 4,305,849 and U.S. Pat. No. 4,812,505. Furthermore, the invention WO 99/31675 discloses a combination of specific glycerol fatty acid esters and polyethylene glycols as additives to polyethylene for improving water-tree resistance. Another solution is presented in WO 85/05216 which describes copolymer blends. The ethylene polymers do not have any significant amounts of carbon-carbon double bonds.

Moreover, the compositions used most in this technical field are crosslinked. Crosslinking can be effected by adding free-radical forming agents like peroxides to the polymeric material prior to or during extrusion (for example cable extrusion). The free-radical forming agent should preferably remain stable during extrusion, performed at a temperature low enough to minimize the early decomposition of the peroxide but high enough to obtain proper melting and homogenisation. Furthermore, the crosslinking agent should decompose in a subsequent crosslinking step at elevated temperature. If e.g. a significant amount of peroxide already decomposes in the extruder, thereby initiating premature crosslinking, this will result in the formation of so-called "scorch", i.e. inhomogeneity, surface uneveness and possibly discolouration in the different layers of the resultant cable. Thus, any significant decomposition of free-radical forming agents during extrusion should be avoided. On the other hand, thermal treatment at the elevated temperature of the extruded polyolefin layer should result in high crosslinking speed and high crosslinking efficiency.

Despite the compositions according to the prior art and the resistance to water-treeing that they afford, a solution that could combine water-tree retardancy in combination with high productivity is needed. The limitations today are partly due to the curing kinetics. Solutions that could enable longer running times, crosslink faster or that could be crosslinked under milder crosslinking conditions would all contribute to a high productivity at the cable manufacturing step. However, increased productivity must not be reached on the expense of resistance to water treeing. The expected life time of an installed cable is more than 30 years. If a cable has an electrical breakdown the affected part of the cable has to be replaced. The costs of the cable are low compared to costs arising by a repair of the damaged part of the cable. Therefore it is of interest to find solutions that offer better water treeing properties that then prolong the service life of the cable if it is exposed to wet or humid environments.

The object of the present invention is therefore to provide a new polymer composition that offers a combination of increased productivity through enhanced crosslinking properties in combination with improved water-tree resistance.

Another object is to reduce the formation of scorch.

These objects are solved by providing a crosslinkable polymer composition comprising
  (i) an unsaturated polyolefin having a total amount of carbon-carbon double bonds/1000 carbon atoms of more than 0.37, and
  (ii) a polar copolymer.

As will be explained below, the polymeric components (i) and (ii) differ in at least one property, e.g. the amount of polar comonomer units which are present within the polymer.

Description of Component (i)

When used in combination with the unsaturated polyolefin, the term "total amount of carbon-carbon double bonds" refers to those double bonds originating from vinyl groups, vinylidene groups and trans-vinylene groups. The amount of each type of double bond is measured as indicated in the experimental part.

The incorporation of the total amount of carbon-carbon double bonds according to the present invention within the polyolefin component enables to accomplish improved crosslinking properties.

In a preferred embodiment, the total amount of carbon-carbon double bonds is at least 0.40/1000 C-atoms. In other preferred embodiments, the total amount of carbon-carbon double bonds is at least 0.45, at least 0.50, at least 0.55, at least 0.60, at least 0.65, at least 0.70, at least 0.75 or at least 0.80/1000 C-atoms.

It is preferred that at least some of the carbon-carbon bonds are vinyl groups. The total amount of vinyl groups is preferably higher than 0.11/1000 carbon atoms. In other preferred embodiments, it is at least 0.15, at least 0.20, at least 0.25, at least 0.30, at least 0.35, at least 0.40, at least 0.45, at least 0.50, at least 0.55, at least 0.60, at least 0.65, at least 0.70, at least 0.75 or at least 0.80 vinyl groups/1000 carbon atoms. Of course, since a vinyl group is a specific type of carbon-carbon double bond, the total amount of vinyl groups for a given unsaturated polyolefin does not exceed its total amount of double bonds.

Two types of vinyl groups can be differentiated. One type of vinyl group is generated by the polymerisation process (e.g. via a β-scission reaction of a secondary radical) or results from the use of chain transfer agents introducing vinyl groups. Another type of vinyl group may originate from a polyunsaturated comonomer used for the preparation of the unsaturated polyolefin, as will be described later in greater detail.

Preferably, the amount of vinyl groups originating from the polyunsaturated comonomer is at least 0.03/1000 carbon atoms. In other preferred embodiments, the amount of vinyl groups originating from the polyunsaturated comonomer is at 0.06, at least 0.09, at least 0.12, at least 0.15, at least 0.18, at least 0.21, at least 0.25, at least 0.30, at least 0.35 or at least 0.40/1000 carbon atoms.

In addition to the vinyl groups originating from the polyunsaturated comonomer, the total amount of vinyl groups may further comprise vinyl groups originating from a chain transfer agent which introduces vinyl groups, such as propylene.

Preferred unsaturated polyolefins of the present invention such as unsaturated polyethylene may have densities higher than 0.860, 0.880, 0.900, 0.910, 0.915, 0.917, or 0.920 g/cm$^3$.

Preferred unsaturated polyolefins of the present invention such as unsaturated polyethylene may have densities not higher than 0.930, 0.935, 0.940, 0.945, 0.950, 0.955, or 0.960 g/cm$^3$.

The polyolefin can be unimodal or multimodal, e.g. bimodal.

In the present invention, the unsaturated polyolefin is preferably an unsaturated polyethylene or an unsaturated polypropylene. Most preferably, the unsaturated polyolefin is an unsaturated polyethylene. Unsaturated polyethylene of low density is preferred. In a preferred embodiment, the unsaturated polyethylene contains at least 60 wt-% ethylene monomer units. In other preferred embodiments, the unsaturated polyethylene contains at least 70 wt-%, at least 80 wt-% or at least 90 wt-% ethylene monomer units.

Preferably, the unsaturated polyolefin is prepared by copolymerising at least one olefin monomer with at least one polyunsaturated comonomer. In a preferred embodiment, the polyunsaturated comonomer consists of a straight carbon chain with at least 8 carbon atoms and at least 4 carbon atoms between the non-conjugated double bonds, of which at least one is terminal.

Ethylene and propylene are preferred olefin monomers. Most preferably, ethylene is used as the olefin monomer. As a comonomer, a diene compound is preferred, e.g. 1,7-octadiene, 1,9-decadiene, 1,11-dodecadiene, 1,13-tetradecadiene, or mixtures thereof. Furthermore, dienes like 7-methyl-1,6-octadiene, 9-methyl-1,8-decadiene, or mixtures thereof can be mentioned.

Siloxanes having the following formula:

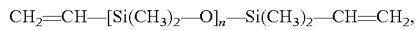

$CH_2=CH-[Si(CH_3)_2-O]_n-Si(CH_3)_2-CH=CH_2$, wherein n=1 or higher
can also be used as a polyunsaturated comonomer. As an example, divinylsiloxanes, e.g. α,ω-divinylsiloxane, can be mentioned.

In addition to the polyunsaturated comonomer, further comonomers can optionally be used. Such optional comonomers can be selected from $C_3$-$C_{20}$ alpha-olefins such as propylene, 1-butene, 1-hexene and 1-nonene.

It is also possible to use polar comonomers, optionally in combination with the $C_3$-$C_{20}$ comonomer(s). Preferably, as polar monomer units, compounds containing hydroxyl groups, alkoxy groups, carbonyl groups, carboxyl groups and ester groups are used.

Still more preferably, the monomer units are selected from the group of alkyl acrylates, alkyl methacrylates, and vinyl acetates or mixture thereof. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate. The acrylate type of monomer is preferred over acetates due to their better resistance to thermal degradation at high temperature.

For example, polar monomer units may be selected from the group of alkylesters of (meth)acrylic acid, such as methyl, ethyl and butyl(meth)acrylate and vinylacetate.

Preferably, the amount of units derived from the polar comonomer is less than 150 micromoles, more preferably less than 125 micromoles, even more preferably less than 100 micromoles, even more preferably less than 85 micromoles and most preferably less than 70 micromoles per gram of unsaturated polyolefin.

The unsaturated polyolefin can be produced by any conventional polymerisation process. Preferably, it is produced by radical polymerisation, such as high pressure radical polymerisation. High pressure polymerisation can be effected in a tubular reactor or an autoclave reactor. Preferably, it is a tubular reactor. Further details about high pressure radical polymerisation are given in WO93/08222, which is herewith incorporated by reference. However, the unsaturated polyolefin can also be prepared by other types of polymerisation process such as coordination polymerisation, e.g. in a low pressure process using any type of supported and non-supported polymerization catalyst. As an example, multi-site including dual site and single site catalyst systems such as Ziegler-Natta, chromium, metallocenes of transition metal compounds, non-metallocenes of late transition metals, said transition and later transition metal compounds belonging to group 3-10 of the periodic table (IUPAC 1989). The coordination polymerization processes and the mentioned catalysts are well-known in the field and may be commercially available or produced according to known literature.

When preparing the unsaturated polyolefin such as an unsaturated polyethylene in a high pressure process, the polymerisation is generally performed at pressures in the range of 1200 to 3500 bar and at temperatures in the range of 150 to 350° C.

Description of Component (ii)

The crosslinkable polymer composition of the present invention further comprises a polar copolymer.

Within the context of the present invention, a polar copolymer is defined to be any copolymer having units derived from a polar comonomer. Further in the context of the present invention, the term 'total amount of carbon-carbon double bonds' for the polar copolymer (component (ii)) refers to those double bonds originating from vinyl groups and vinylidene groups. The amount of each type of double bond is measured as indicated in the experimental part. The incorporation of the total amount of carbon-carbon double bonds according to the present invention enables to accomplish for the improved crosslinking properties.

Preferably, as a polar comonomer, compounds containing hydroxyl groups, alkoxy groups, carbonyl groups, carboxyl groups, and ester groups, are used.

More preferably, compounds containing carboxyl and/or ester groups are used and still more preferably, the compound is selected from the groups of acrylates and acetates.

Still more preferably, the polar comonomer is selected from the group of alkyl acrylates, alkyl methacrylates, and vinyl acetate or mixture thereof. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene—with $C_1$- to $C_4$-alkyl, such as methyl, ethyl, propyl or butyl acrylates or vinyl acetate.

For example, polar monomer units may be selected from the group of alkylesters of (meth)acrylic acid such as methyl, ethyl and butyl(meth)acrylate and vinylacetate. The acrylate type of polar comonomer is preferred over acetates due to their better resistance to thermal degradation at high temperatures.

Preferably, the polar copolymer is prepared by copolymerizing an olefin monomer and a polar comonomer.

In a preferred embodiment, the olefin monomer is selected from ethylene or $C_3$ to $C_{20}$ alpha-olefins such as propylene, 1-butene, 4-methyl-1-pentene, 1-hexene, 1-octene or 1-nonene, or mixtures thereof. Even more preferred, the olefin monomer is ethylene.

Preferably, the polar copolymer has an amount of units derived from the polar comonomer of more than 500 micromoles per gram of polar copolymer.

As discussed above, within the unsaturated polyolefin, the amount of units derived from a polar comonomer is preferably less than 150 micromoles per gram of unsaturated polyolefin. Thus, when providing a polar copolymer having an amount of units derived from a polar comonomer of preferably more than 500 micromoles per gram of polar copolymer, the polymeric components (i) and (ii) of the crosslinkable polymer composition differ in at least one property and are clearly distinguishable.

In other preferred embodiments, the polar copolymer has an amount of units derived from the polar comonomer of more than 700 micromoles, more than 900 micromoles, or more than 1100 micromoles per gram of polar copolymer.

In a preferred embodiment, the polar copolymer has a total amount of carbon-carbon double bonds (i.e. here the sum of vinyl and vinylidene) of at least 0.15/1000 C-atoms. In other preferred embodiments, the total amount of carbon-carbon double bonds is at least 0.20, at least 0.25, at least 0.30 or at least 0.35/1000 C-atoms.

The total amount of vinyl groups of the polar copolymer is preferably higher than 0.01/1000 carbon atoms. In other preferred embodiments, it is at least 0.05, at least 0.08, at least 0.10, at least 0.12, at least 0.15, at least 0.20, at least 0.25, at least 0.30, at least 0.35, at least 0.40 vinyl groups/1000 carbon atoms. Of course, since a vinyl group is a specific type of carbon-carbon double bond, the total amount of vinyl groups for a given unsaturated polyolefin does not exceed its total amount of double bonds.

Preferably, the amount of vinyl groups originating from the polyunsaturated comonomer is at least 0.03/1000 carbon atoms. In other preferred embodiments, the amount of vinyl groups originating from the polyunsaturated comonomer is at 0.06, at least 0.09, at least 0.12, at least 0.15, at least 0.18, at least 0.21, at least 0.25, at least 0.30, at least 0.35 or at least 0.40/1000 carbon atoms.

Within the context of the present invention, it is also possible to use a polar copolymer having vinylidene groups but substantially no vinyl groups, wherein the amount of carbon-carbon double bonds/1000 C-atoms originating from the vinylidene groups is at least 0.15, 0.20, 0.25, 0.30 or at least 0.35.

Preferably, the polar copolymer comprises units derived from a polyunsaturated comonomer. In a preferred embodiment, the polyunsaturated comonomer consists of a straight carbon chain with at least 8 carbon atoms and at least 4 carbon atoms between the non-conjugated double bonds, of which at least one is terminal.

As preferred polyunsaturated comonomers, the following dienes can be mentioned:
1,7-octadiene, 1,9-decadiene, 1,11-dodecadiene, 1,13-tetradecadiene, or mixtures thereof. Furthermore, dienes like 7-methyl-1,6-octadiene, 9-methyl-1,8-decadiene, or mixtures thereof.

Siloxanes having the following formula:

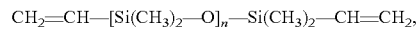

$$CH_2=CH-[Si(CH_3)_2-O]_n-Si(CH_3)_2-CH=CH_2,$$

wherein n=1 or higher
can also be used as a polyunsaturated comonomer. As an example, divinylsiloxane, e.g. α,ω-divinylsiloxane, can be mentioned.

In a preferred embodiment, the polar copolymer comprises units derived from an olefin comonomer. Preferably, the olefin comonomer is selected from ethylene, a $C_3$ to $C_{20}$ alpha-olefin such as propylene, 1-butene, 4-methyl-1-pentene, 1-hexene, 1-octene or 1-nonene, or mixtures thereof.

Preferably, the polar copolymer has a melt flow rate $MFR_{2.16/190°\,C.}$ in the range of 0.5 to 70 g/10 min, more preferably 1-55 g/10 min, even more preferably 1.5-40 g/10 min.

When the polar copolymer is prepared by copolymerizing an olefin such as ethylene with a polar comonomer, optionally in the presence of a polyunsaturated comonomer and/or a $C_3$ to $C_{20}$ alpha-olefin comonomer, this is preferably effected in a high pressure process resulting in low density polyethylene or in a low pressure process in the presence of a catalyst, for example a chromium, Ziegler-Natta or single-site catalyst resulting in either unimodal or multimodal polyethylene.

The multimodal polymer is preferably produced either by mechanical blending of components or in a multi-stage process in a multi-step reaction sequence such as described in WO092/12182.

When preparing the polar ethylene copolymer in a high pressure process, polymerization is generally performed at a pressure of 1200 to 3500 bars and a temperature of 150 to 350° C.

Description of the Blend of Component (i) and Component (ii)

In a preferred embodiment, the polymeric components (i) and (ii) of the crosslinkable polymer composition of the present invention are prepared separately and are subsequently blended with each other to result in a blend.

Preferably, the crosslinkable polymer composition comprises an amount of 5 to 60 wt-%, more preferably, 8 to 50 wt %, even more preferably 10-40 wt-% and even more preferably 15-35 wt-% of polar copolymer, based on the weight of the crosslinkable polymer composition.

In a preferred embodiment, the crosslinkable polymer composition comprises a total amount of units derived from the polar comonomer of 100 to 800 micromoles, more preferably 150 to 700 micromoles and even more preferably 200 to 600 micromoles per gram of crosslinkable polymer composition. The total amount of polar comonomer units also includes those of the unsaturated polyolefin, if present.

Preferably, the crosslinkable polymer composition has a total amount of carbon-carbon double bonds/1000 carbon atoms of more than 0.30, more preferred more than 0.35, 0.40, 0.45, 0.50, 0.55, or more than 0.60 carbon-carbon double bonds/1000 carbon atoms. The total amount of double bonds of the crosslinkable polymer composition is based on vinyl, vinylidene and trans-vinylene groups/1000 C-atoms of component (i) and, if present, on vinyl and vinylidene groups/1000 C-atoms of component (ii).

Furthermore, it is preferred that the crosslinkable polymer composition has a total amount of vinyl groups/1000 carbon atoms of more than 0.05. Again, the total amount of vinyl groups includes those of the polar copolymer, if present. In other preferred embodiments, the crosslinkable polymer composition has a total amount of vinyl groups/1000 carbon atoms of at least 0.10, at least 0.15, at least 0.20, at least 0.25, at least 0.30, at least 0.35, at least 0.40, or at least 0.45.

In a preferred embodiment, the crosslinkable polymer composition according to the present invention further comprises a crosslinking agent. In the context of the present invention, a crosslinking agent is defined to be any compound capable to generate radicals which can initiate a crosslinking reaction. Preferably, the crosslinking agent contains at least one —O—O— bond or at least one —N=N— bond. More preferably, the crosslinking agent is a peroxide known in the field.

The crosslinking agent, e.g. a peroxide, is preferably added in an amount of 0.1-3.0 wt.-%, more preferably 0.15-2.6 wt.-%, most preferably 0.2-2.2 wt.-%, based on the weight of the crosslinkable polymer composition.

As peroxides used for crosslinking, the following compounds can be mentioned: di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, di(tert-butylperoxy-isopropyl)benzene, butyl-4,4-bis(tert-butylperoxy)valerate, 1,1-bis(tert-butylperoxy)-3,3,5-trimethylcyclohexane, tert-butylperoxybenzoate, dibenzoylperoxide.

Preferably, the peroxide is selected from 2,5-di(tert-butylperoxy)-2,5-dimethyl-hexane, di(tert-butylperoxy-isopropyl)benzene, dicumylperoxide, tert-butylcumylperoxide, di(tert-butyl)peroxide, or mixtures thereof. Most preferably, the peroxide is dicumylperoxide.

Preferably, the crosslinkable polymer composition further comprises a scorch retarder. In the context of the present invention, a "scorch retarder" is defined to be a compound that reduces the formation of scorch during extrusion of a polymer composition, at typical extrusion temperatures used, if compared to the same polymer composition extruded without said compound. Besides scorch retarding properties, the scorch retarder may simultaneously result in further effects like boosting, i.e. enhancing crosslinking performance during the crosslinking step.

Preferably, the scorch retarder is selected from 2,4-diphenyl-4-methyl-1-pentene, substituted or unsubstituted diphenylethylene, quinone derivatives, hydroquinone derivatives, monofunctional vinyl containing esters and ethers, or mixtures thereof. More preferably, the scorch retarder is selected from 2,4-diphenyl-4-methyl-1-pentene, substituted or unsubstituted diphenylethylene, or mixtures thereof. Most preferably, the scorch retarder is 2,4-diphenyl-4-methyl-1-pentene.

Preferably, the amount of scorch retarder is within the range of 0.005 to 1.0 wt.-%, more preferably within the range of 0.01 to 0.8 wt.-%, based on the weight of the crosslinkable polyolefin composition. Further preferred ranges are 0.03 to 0.75 wt-%, 0.05 to 0.70 wt-% and 0.07 to 0.50 wt-%, based on the weight of the crosslinkable polyolefin composition.

The polymer composition may contain further additives, such as antioxidants, stabilisers, processing aids, and/or crosslinking boosters. As antioxidant, sterically hindered or semi-hindered phenols, aromatic amines, aliphatic sterically hindered amines, organic phosphates, thio compounds, and mixtures thereof, can be mentioned. Typical crosslinking boosters may include compounds having an allyl group, e.g. triallylcyanurate, triallylisocyanurate, and di-, tri- or tetra-acrylates. As further additives, flame retardant additives, acid scavengers, inorganic fillers and voltage stabilizers can be mentioned.

If an antioxidant, optionally a mixture of two or more antioxidants, is used, the added amount can range from 0.005 to 2.5 wt-%, based on the weight of the crosslinkable polymer composition. If the unsaturated polyolefin in the crosslinkable polymer composition is an unsaturated polyethylene, the antioxidant(s) are preferably added in an amount of 0.005 to 0.8 wt-%, more preferably 0.01 to 0.60 wt-%, even more preferably 0.05 to 0.50 wt-%, based on the weight of the crosslinkable polymer composition. If the unsaturated polyolefin in the crosslinkable polymer composition is an unsaturated polypropylene, the antioxidant(s) are preferably added in an amount of 0.005 to 2 wt-%, more preferably 0.01 to 1.5 wt-%, even more preferably 0.05 to 1 wt-%, based on the weight of the crosslinkable polymer composition.

Further additives may be present in an amount of 0.005 to 3 wt %, more preferably 0.005 to 2 wt %, based on the weight of the crosslinkable polymer composition. Flame retardant additives and inorganic fillers can be added in higher amounts.

From the crosslinkable polymer composition described above, a crosslinked composition can be prepared by blending with a crosslinking agent, followed by treatment under crosslinking conditions, thereby increasing the crosslinking level. Crosslinking can be effected by treatment at increased temperature, e.g. at a temperature of at least 160° C. When peroxides are used, crosslinking is generally initiated by increasing the temperature to the decomposition temperature of the corresponding peroxide. When the peroxide decomposes, radicals are generated from the peroxide. These radicals then intitiate the crosslinking reaction.

Preferably, the crosslinked polymer composition has a hot set elongation value of less than 175%, more preferably less than 100%, even more preferably less than 90%, determined according to IEC 60811-2-1. Hot set elongation values are related to the degree of crosslinking. The lower the hot set elongation value, the more crosslinked is the material.

As will be demonstrated below in the examples, the crosslinkable polymer composition of the present invention can be crosslinked at higher crosslinking speed and results in a crosslinked polymer composition having an improved electric breakdown strength after wet ageing. The crosslinking speed is an important parameter. If the formulation has an improved crosslinking performance, this can for example be seen in that it takes a shorter time to reach a certain degree of crosslinking. If that is the case, then this could be utilised in different ways: e.g. by running the cable line at an increased line speed or a lower crosslinking temperature profile could be used in the vulcanising tube. One way of evaluating the crosslinking speed is to determine the time needed to reach for example 90% of the final torque value (M90%). The time need is referred to T90%. If the M90% torque value for the reference formulation is determined this value could be compared with the time needed for the inventive formulations to reach that M90% value of the reference material. If a formulation has a shorter T90% value than the used reference, i.e. this formulation reaches the targeted torque value after a shorter time period, demonstrates that this formulation crosslinks faster. In practice this means that this material can be run with an increased line speed on a cable line. Further details about crosslinking speed will be provided below in the examples. Another way of utilizing this enhanced crosslinking performance is to reduce the amount of peroxide needed to reach a certain degree of crosslinking.

Increasing the electric field applied to an insulation system, the dielectric material will get an electrical breakdown at a certain value, the so-called breakdown strength. This involves a destructive sudden flow of current leading to a conductive path through the dielectric material, which cannot any longer support an applied voltage.

A dielectric usually is being used at nominal field well below the breakdown strength, but different kind of degradation processes (ageing), for example water treeing, may reduce the breakdown strength over time, possibly to such low levels that the system fails during service.

There are numerous ways to evaluate the resistance of the insulating material to water tree degradation. In the present invention, the method is based on model cables consisting of an inner semiconductive layer, insulation layer and an outer semiconductive layer. The insulation has a thickness of 1.5 mm. The ageing conditions are 9 kV/mm, 50 Hz, 85° C. in the water filled conductor area, 70° C. in the surrounding water, and an ageing time of 1000 h. The breakdown strength of these model cables is determined before and after ageing. As shown below in the examples, assessment of water tree retarding properties of a polymeric material can be made on the basis of electric breakdown strength measurements after ageing in water. Polymers still having high breakdown strength after ageing in water are considered to have an improved resistance to the formation of water trees.

In a preferred embodiment, the crosslinked polymer composition has an electric breakdown strength of at least 45 kV/mm after 1000 h wet ageing at the ageing conditions described in this section. The semiconductive material used in the model cable test, both as inner and outer semicon, could be described in the following way: a poly(ethylene-co-butylacrylate) polymer with a butylacrylate content of 1300 micromoles containing 40 wt % of a conductive furnace black. The composition is stabilised with an antioxidant of the polyquinoline type and contains 1 wt % of a peroxide as a crosslinking agent.

From the crosslinkable polymer composition of the present invention, a multilayered article can be prepared wherein at least one layer comprises said polymer composition. When crosslinking is initiated, a crosslinked multilayered article is obtained. Preferably, the multilayered article (either crosslinked or not) is a cable, preferably a power cable.

In the context of the present invention, a power cable is defined to be a cable transferring energy operating at any voltage. The voltage applied to the power cable can be alternating (AC), direct (DC), or transient (impulse). In a preferred embodiment, the multilayered article is a power cable operating at voltages higher than 1 kV. In other preferred embodiments, the power cable prepared according to the present invention is operating at voltages higher than 6 kV, higher than 10 kV or higher than 33 kV.

The multilayered article can be prepared in a process wherein the crosslinkable composition of the present invention, in combination with a crosslinking agent, is applied onto a substrate by extrusion. In such an extrusion process, the sequence of mixing the components of the crosslinkable composition can be varied, as explained below.

According to a preferred embodiment, the unsaturated polyolefin and the polar copolymer are mixed with each other and with one or more antioxidants, possibly in combination with further additives, either on solid pellets or powder of the different polymer components or by melt mixing, followed by forming pellets from the melt. Subsequently, the crosslinking agent, preferably a peroxide, and optionally a scorch retarder and/or a crosslinking booster are added to the pellets or powder in a second step. Alternatively, the scorch retarder and/or crosslinking booster could already be added in the first step, together with the antioxidant(s). The final pellets are fed to the extruder, e.g. a cable extruder.

According to another preferred embodiment, instead of a two-step process, the unsaturated polyolefin and the polar copolymer, preferably in the form of pellets or powder, the antioxidant(s) and crosslinking agent, and optionally a scorch retarder and/or further additives such as a crosslinking booster, are added to a compounding extruder, single or twin screw.

Preferably, the compounding extruder is operated under careful temperature control.

According to another preferred embodiment, a mix of all components, i.e. including antioxidant(s) and crosslinking agent and optionally a scorch retarder and/or further additives such as a crosslinking booster, are added onto the pellets or powder made of the unsaturated polyolefin and the polar copolymer.

According to another preferred embodiment, pellets made of the unsaturated polyolefin and the polar copolymer, optionally further containing antioxidant(s) and additional additives, are prepared in a first step, e.g. by melt mixing. These pellets, obtained from the melt mixing, are then fed into the cable extruder. Subsequently, crosslinking agent and optionally a scorch retarder and/or a crosslinking booster are either fed in the hopper or directly into the cable extruder. Alternatively, crosslinking agent and/or scorch retarder and/or crosslinking booster are already added to the pellets before feeding these pellets into the cable extruder.

According to another preferred embodiment, pellets made of the unsaturated polyolefin and the polar copolymer without any additional components are fed to the extruder. Subsequently, antioxidant(s), crosslinking agent and optionally a scorch retarder, optionally in combination with further additives such as a crosslinking booster, are either fed in the hopper or directly fed into the polymeric melt within the cable extruder. Alternatively, at least one of these components, i.e. crosslinking agent, scorch retarder, crosslinking booster, antioxidant(s), or a mixture of these components is already added to the pellets before feeding these pellets into the cable extruder.

According to another preferred embodiment, a highly concentrated master batch is prepared. The master batch may comprise one or more of the following components: antioxidant(s), scorch retarder and/or crosslinking booster and crosslinking agent. The polar copolymer could also be provided in a master batch. Furthermore, it is possible to provide each of the additives mentioned above in a separate master batch. The one or more master batches are then added to or mixed with the unsaturated polyolefin and optionally the polar copolymer, if not already provided in a master batch. If there is any component not added through the masterbatch, that component either has to be present in the pellets or powder used from the start or it has to be added separately prior to or during the extrusion process.

When producing a power cable by extrusion, the polymer composition can be applied onto the metallic conductor and/or at least one coating layer thereof, e.g. a semiconductive layer or insulating layer. Typical extrusion conditions are mentioned in WO 93/08222.

EXAMPLES

Testing Methods/Measuring Methods (a) Determination of the Amount of Double Bonds for Polymers without Units Derived from a Polar Comonomer The procedure outlined below is to be used for those unsaturated polyolefins which have no or less than 0.4 wt % of polar comonomer units. If polar comonomer units are present, the procedure described under item (b) is used.

The procedure for the determination of the amount of double bonds/1000 C-atoms is based upon the ASTM D3124-72 method. In that method, a detailed description for the determination of vinylidene groups/1000 C-atoms is given based on 2,3-dimethyl-1,3-butadiene. The described sample preparation procedure has also been applied for the determination of vinyl groups/1000 C-atoms, vinylidene groups/1000 C-atoms and trans-vinylene groups/1000 C-atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analysed by means of IR spectrometry and given as the amount of vinyl bonds, vinylidene bonds and trans-vinylene bonds, respectively.

Thin films were pressed with a thickness of 0.5-1.0 mm. The actual thickness was measured. FT-IR analysis was performed on a Perkin Elmer 2000. Four scans were recorded with a resolution of 4 cm$^{-1}$.

A base line was drawn from 980 cm$^{-1}$ to around 840 cm$^{-1}$. The peak heights were determined at around 888 cm$^{-1}$ for vinylidene, around 910 cm$^{-1}$ for vinyl and around 965 cm$^{-1}$ for trans-vinylene. The amount of double bonds/1000 carbon atoms was calculated using the following formulas:

$$\text{vinylidene}/1000 \text{ C-atoms} = (14 \times A)/(18.24 \times L \times D)$$

$$\text{vinyl}/1000 \text{ C-atoms} = (14 \times A)/(13.13 \times L \times D)$$

$$\text{trans-vinylene}/1000 \text{ C-atoms} = (14 \times A)/(15.14 \times L \times D)$$

wherein
A: absorbance (peak height)
L: film thickness in mm
D: density of the material (g/cm$^3$)

(b) Determination of the Amount of Double Bonds for Polymers Having Units Derived from a Polar Comonomer and Having a Polar Comonomer Content Higher than 0.4 Wt-%.

The procedure corresponds to the one outlined above with the exception of base line definition. For base line definition, see Table 2. The procedure is to be used for the polar copolymer and, if present, for those unsaturated polyolefins having units originating from a polar comonomer.

Total double bond content for the component (ii) is based on the sum of vinyl/1000 C and vinylidene/1000 C.

(c) Determination of the Vinyl Content Originating from the Polyunsaturated Compound The number of vinyl groups originating from the polyunsaturated comonomer (i.e. in this example 1,7-octadiene) per 1000 carbon atoms was determined as follows:

Inventive polymers 1-3 and reference polymer 4 have been produced on the same reactor, basically using the same conditions, i.e. similar temperature and pressure. Then, it is assumed that the base level of vinyl groups, i.e. the ones formed by the process without the addition of chain transfer agent resulting in vinyl groups, is the same for the reference and for polymers 1-3. This base level is then subtracted from the measured numbers of vinyl groups in polymers 1-3, thereby resulting in the number of vinyl groups/1000 C-atoms, which result from the polyunsaturated comonomer.

All polymers were polymerised in a high pressure tubular reactor at a pressure of 1000 to 3000 bar and a temperature of 100 to 300° C. All polymers have a density within the range of 0.920-0.925 g/cm$^3$.

(d) Density Measurements

The density was determined on a pressed plaque or from a string from the MFR equipment. In case of a plaque, this was pressed at 175° C. and the cooling rate used 15° C./min. A piece was cut out from the string or from the plaque and this piece was then conditioned in boiling water for 30 minutes followed by cooling for 1 h (material still kept in the water). Then the density measurement was done in a density column. Parts of this procedure follow the ASTM D2839.

(e) Elastograph Measurements of the Degree of Crosslinking

The degree of crosslinking was determined on a Göttfert Elastograph™. The measurements were carried out using press-moulded circular plaques. First, a circular plaque was pressed at 120° C., 2 min. without pressure, followed by 2 min. at 5 tons. Then, the circular plaque was cooled to room temperature. In the Elastograph, the evolution of the torque is measured as a function of crosslinking time at 180° C. The reported torque values are those reached after 10 minutes of crosslinking at 180° C.

In the torque measurements which are carried out as explained above, the evolution of the torque as a function of time is monitored. In addition thereto, the time to reach a certain degree of cure was recorded as a way to assess the crosslinking speed properties. Here the degree of cure was chosen to be 90% of the final torque value in a reference material (here Comparative Example 1 and Comparative Example 2 respectively). This torque value is then referred to as the M90% value and the time needed to reach the respective M90% value is the so-called T90% value. The M90% cure value is determined according to the equation given below where the $M_{max}$ value is the maximum torque value reached and the $M_{min}$ is the minimum torque value in the curve. The calculation is done according to the following equation:

$$M90\%\text{cure} = M_{min} + 0.90(M_{max} - M_{min})$$

This M90% cure value was calculated for Comparative formulation 1 and Comparative formulation 2, see the Examples part. From this M90% cure value the T90% is calculated. The shorter the time needed to reach the M90% for the respective Comparative formulation the higher the crosslinking speed.

(f) Measurement of Hot Set and Permanent Deformation

Hot set elongation and permanent deformation are determined on crosslinked plaques. These plaques are prepared as follows: First, the pellets were melted at 115° C. at around 10 bar for 2 minutes. Then the pressure was increased to 200 bar, followed by ramping the temperature up to 165° C. The material was kept at 165° C. for 25 minutes and after that it was cooled down to room temperature at a cooling rate of 15° C./min. The thickness of the plaque was around 1.8 mm.

The hot set elongation as well as the permanent deformation were determined on samples taken from the crosslinked plaques. These properties were determined according to IEC 60811-2-1. In the hot set test, a dumbbell of the tested material is equipped with a weight corresponding to 20 N/cm$^2$. This specimen is put into an oven at 200° C. and after 15 minutes, the elongation is measured. Subsequently, the weight is removed and the sample is allowed to relax for 5 minutes. Then, the sample is taken out from the oven and is cooled down to room temperature. The permanent deformation is determined.

(g) Melt Flow Rate

The melt flow rate is equivalent to the term "melt index" and is determined according to ISO 1133 and is indicated in g/10 min. Melt flow rate is determined at different loadings, such as 2.16 kg ($MFR_2$). Melt flow rate is determined at a temperature of 190° C.

(h) Wet Ageing Test

The wet ageing test is based on a procedure described in an article by Land H. G. and Schädlich H., "Model Cable Test for Evaluating the Ageing Behaviour under Water Influence of Compounds for Medium Voltage Cables", Conference Proceedings of Jicable 91, Jun. 24 to 28, 1991, Versaille, France.

The wet ageing properties were evaluated on (model cables) minicables. These cables consist of a Cu wire onto which an inner semiconductive layer, an insulation layer and an outer semiconductive layer are applied. The model cable has the following construction: inner semiconductive layer of 0.7 mm, insulation layer of 1.5 mm and outer semiconductive layer of 0.15 mm. The cables are extruded and vulcanised, i.e. the material is crosslinked. The normal vulcanisation speed is 5.0/min. After this the model cables are preconditioned at 80° C. for 72 h.

The Cu wire is removed and then replaced by a thinner Cu wire. The cables are put into water bath to be aged for 1000 h under electric stress and at a temperature of 70° C. of the surrounding water and at a temperature of the water in the conductor area of 85° C. The initial breakdown strength as well as the breakdown strength after 1000 h wet ageing are determined.

The cables are prepared and aged as described below.

| | |
|---|---|
| Preconditioning: | 80° C., 72 h |
| Applied voltage: | 9 kV/50 Hz |
| Electric stress (max.): | 9 kV/mm |
| Electric stress (mean): | 6 kV/mm |
| Conductor temperature: | 85° C. |
| Water bath temperature: | 70° C. |
| Ageing time: | 1000 h |

Deionized water in conductor and outside: if not otherwise stated

Five specimens with 0.50 m active length from each cable were aged.

The specimens were subjected to ac breakdown tests (voltage ramp: 100 kV/min.) and the Weibull 63.2% values of the breakdown strength (field stress at the inner semiconductive layer) are determined before and after ageing.

Polymers (a) Unsaturated Polyolefin

Polymer 1 to 3 are ethylene copolymers: poly(ethylene-co-1,7-octadiene) polymers containing different levels of 1,7-octadiene.

(b) Polar Copolymer

Polymer 5 and polymer 6 are both polar ethylene co-polymers, a poly(ethylene-co-butylacrylate) containing different amounts of butylacrylate.

Polymer 7 is a polar ethylene co-polymer, a poly(ethylene-co-methylacrylate).

Polymer 8 is a polar ethylene terpolymer that contains ethylene, 1,7-octadiene and butylacrylate.

(c) Reference

Polymer 4 is an ethylene homopolymer that is used as the reference material.

More data around the polymers can be found in Table 1 and 2.

TABLE 1

Amount and type of double bonds in polymers 1-4

| Sample | $MFR_{2.16,190° C.}$ (g/10 min) | Total amount of double bonds/1000 C. | Total amount vinyl/1000 C. | Vinyl from diene/1000 C. | Vinylidene/ 1000 C. | Trans-vinylene/ 1000 C. |
|---|---|---|---|---|---|---|
| Polymer 1 | 2.7 | 1.17 | 0.82 | 0.71 | 0.24 | 0.11 |
| Polymer 2 | 2.0 | 0.60 | 0.31 | 0.2 | 0.23 | 0.06 |
| Polymer 3 | 2.0 | 0.53 | 0.26 | 0.15 | 0.21 | 0.06 |
| Polymer 4 | 2.0 | 0.37 | 0.11 | — | 0.22 | 0.04 |

TABLE 2

Characteristics of the polar ethylene copolymers 5 to 8.

| Sample | $MFR_{2.16,190° C.}$ (g/10 min) | Acrylate type | Acrylate content (wt %) | Vinyl/ 1000 C. | Vinyl from diene/ 1000 C. | Vinylidene/ 1000 C. | Total amount of double bonds/1000 C. (vinyl + vinylidene) |
|---|---|---|---|---|---|---|---|
| Polymer 5 | ≈8 | butyl-acrylate | ≈17 | 0.10[a] | — | 0.22[a] | 0.32 |
| Polymer 6 | ≈4 | butyl- | ≈21 | 0[b] | — | 0.18[b] | 0.18 |

TABLE 2-continued

Characteristics of the polar ethylene copolymers 5 to 8.

| Sample | MFR$_{2.16,190°C.}$ (g/10 min) | Acrylate type | Acrylate content (wt %) | Vinyl/ 1000 C. | Vinyl from diene/ 1000 C. | Vinylidene/ 1000 C. | Total amount of double bonds/1000 C. (vinyl + vinylidene) |
|---|---|---|---|---|---|---|---|
| Polymer 7 | ≈8-9 | acrylate methyl-acrylate | ≈13 | 0.13$^c$ | — | 0.25$^c$ | 0.38 |
| Polymer 8 | ≈7.2 | butyl-acrylate | 16.8 | 0.41$^d$ | 0.31 | 0.16$^d$ | 0.57 |

$^a$base line between 917 to 868 cm$^{-1}$
$^b$base line between 918 to 868 cm$^{-1}$
$^c$base line between 929 to 872 cm$^{-1}$
$^d$base line between 919 to 868 cm$^{-1}$ Using the polymers described above, formulations are prepared. Further details about the formulations are provided in Table 3.

The amount of units derived from a polar comonomer is given in micromoles per gram of the polymers or crosslinkable polymer composition and is calculated in the following way:

1 g formulation contains X wt-% of the polar ethylene copolymer. The polar ethylene copolymer contains Y wt-% polar comonomer units. The molecular weight of the polar comonomer unit used (M$_{polar\ comonomer\ unit}$) has to be introduced, for example 86 g/mole for methylacrylate, and 128 g/mole for butylacrylate. Below an example is given for Inventive formulation 3.

$$\frac{(1 \times 0.23 \times 0.17)}{128} = 305 \times 10^{-6} \text{ moles (or 305 micromoles)}$$

The two components, i.e. Component (i) and Component (ii) were blended in the molten state either in an extruder or in a Brabender mixing chamber and then pelletised.

Antioxidant (AO) is 4,4'-thiobis (2-tertbutyl-5-methylphenol) (CAS number 96-96-5).

Crosslinking agent is dicumylperoxide (CAS number 80-43-3). Scorch retarder is 2,4-diphenyl-4-methyl-1-pentene (CAS number 6362-80-7).

TABLE 3b

Summary of the calculated content of double bonds/1000 C. in the blend compositions used.

| Sample | Component (i) | Component (ii) | Calculated double bond content/1000 C. |
|---|---|---|---|
| Inventive formulation 1 | Polymer 1 (79.8%) | Polymer 6 (20%) | 0.97 |
| Inventive formulation 2 | Polymer 3 (79.8%) | Polymer 6 (20%) | 0.46 |
| Comparative example 1 | Polymer 4 (79.8%) | Polymer 6 (20%) | 0.33 |
| Inventive formulation 3 | Polymer 2 (76.8%) | Polymer 5 (23%) | 0.53 |
| Inventive | Polymer 2 | Polymer 8 | 0.59 |

TABLE 3a

Summary of the copolymer compositions used.

| Sample | Component (i) | Component (ii), amount in wt % of crosslinkable polymer composition | Polar comonomer, amount in micromole/g of crosslinkable polymer composition | AO content (wt %) | Crosslink. agent (wt %) | Scorch retarder (wt %) |
|---|---|---|---|---|---|---|
| Inventive formulation 1 | Polymer 1 | Polymer 6 20 wt-% | 328 micromole | ≈0.2% | 1.9% | — |
| Inventive formulation 2 | Polymer 3 | Polymer 6 20 wt % | 328 micromole | ≈0.2% | 1.9% | |
| Comparative example 1 | Polymer 4 | Polymer 6 20 wt % | 328 micromole | ≈0.2% | 1.9% | — |
| Inventive formulation 3 | Polymer 2 | Polymer 5 23 wt % | 305 micromole | ≈0.2% | 1.85% | 0.35% |
| Inventive formulation 4 | Polymer 2 | Polymer 8 23 wt % | 305 micromole | ≈0.2% | 1.85% | 0.35% |
| Comparative example 2 | Polymer 4 | Polymer 5 23 wt % | 305 micromole | ≈0.2% | 1.85% | 0.35% |
| Inventive formulation 5 | Polymer 2 | Polymer 7 23 wt % | 348 micromole | ≈0.2% | 1.9% | 0.4% |
| Inventive formulation 6 | Polymer 3 | Polymer 6 15 wt % | 246 micromole | ≈0.25% | 2.20% | 0.4% |
| Comparative example 3 | Polymer 4 | Polymer 8 23 wt % | 305 micromole | ≈0.2% | 1.85% | 0.35% |
| Comparative example 4 | Polymer 3 | — | — | ≈0.2% | 2.1% | 0.4% |

TABLE 3b-continued

Summary of the calculated content of double bonds/1000 C. in the blend compositions used.

| Sample | Component (i) | Component (ii) | Calculated double bond content/1000 C. |
|---|---|---|---|
| formulation 4 | (76.8%) | (23%) | |
| Comparative example 2 | Polymer 4 (76.8%) | Polymer 5 (23%) | 0.36 |
| Inventive formulation 5 | Polymer 2 (76.8%) | Polymer 7 (23%) | 0.55 |
| Comparative example 3 | Polymer 4 (76.8%) | Polymer 8 (23%) | 0.42 |
| Comparative example 4 | Polymer 3 | — | 0.53 |

Total double bond content in Component (i) is based on vinyl, vinylidene and trans-vinylene as described earlier.

Total double bond content in Component (ii) is based on vinyl and vinylidene as described earlier.

Calculation based on the formulation containing antioxidant only.

TABLE 3c

Summary of the calculated content of vinyl groups/1000 C. in the blend compositions used.

| Sample | Component (i) | Component (ii) | Calculated content of vinyl groups/1000 C. |
|---|---|---|---|
| Inventive formulation 1 | Polymer 1 (79.8 wt %) | Polymer 6 (20 wt %) | 0.65 |
| Inventive formulation 2 | Polymer 3 (79.8 wt %) | Polymer 6 (20 wt %) | 0.09 |
| Comparative example 1 | Polymer 4 (79.8 wt %) | Polymer 6 (20 wt %) | 0.21 |
| Inventive formulation 3 | Polymer 2 (76.8 wt %) | Polymer 5 (23 wt %) | 0.26 |
| Inventive formulation 4 | Polymer 2 (76.8 wt %) | Polymer 8 (23 wt %) | 0.33 |
| Comparative example 2 | Polymer 4 (76.8 wt %) | Polymer 5 (23 wt %) | 0.11 |
| Inventive formulation 5 | Polymer 2 (76.8 wt %) | Polymer 7 (23 wt %) | 0.27 |
| Comparative example 3 | Polymer 4 (76.8 wt %) | Polymer 8 (23 wt %) | 0.18 |
| Comparative example 4 | Polymer 3 | — | 0.26 |

These calculations are based on the total amount of vinyl groups in component (i) and the total amount of vinyl groups in component (ii).

The crosslinking properties were evaluated by Göttfert Elastograph measurements performed at 180° C. In some cases, the hot set properties were measured. With hot set properties is meant hot set elongation and the permanent deformation measured under the conditions described under experimental.

TABLE 4

Summary of the crosslinking results.

| Sample | Elastograph value (Nm) | Time to torque corresponding to T90% in reference (s) | Hot set elongation (%) | Permanent deformation (%) |
|---|---|---|---|---|
| Inventive formulation 1 | 0.95 | 90* | 22.7 | 0 |
| Inventive formulation 2 | 0.63 | 156* | 59.8 | 2.8 |
| Comparative example 1 | 0.54 | 224* | 88.7 | 3.0 |
| Inventive formulation 3 | 0.70 | 204** | 43.2 | 0.9 |
| Inventive formulation 4 | 0.72 | 198** | 38.0 | −0.5 |
| Comparative example 2 | 0.67 | 226** | 49.1 | 0 |
| Inventive formulation 5 | 0.65 | | 37.2 | −0.3 |
| Comparative example 3 | | | 51.9 | 1.9 |
| Comparative example 4 | | | 29.0 | 0 |

*time to reach 0.50 Nm which is the M90% value in Comparative example 1. Inventive formulation 1 and 2 are compared with Comparative example 1.
**time to reach 0.61 Nm which is the M90% in Comparative example 2. Inventive formulation 3 and 4 are compared with Comparative example 2.

As can be seen from the examples, the formulations with an increased level of double bonds and vinyl groups reached lower hot set elongation values, lower values on the permanent deformation and higher torque values. All this indicates that these materials are more crosslinked. The inventive formulations 1 and 2, when compared to comparative formulation 1, also have shorter T90% values. This shows that these formulations crosslink with a higher crosslinking speed. The same trends are also observed in inventive formulations 4 and 5 and comparative example 2.

TABLE 5

Summary of the wet ageing results.

| Sample | line speed at vulcanisation (min$^{-1}$) | $Eb_{63\%}$ (0 h) (kV/mm) | $Eb_{63\%}$ (1000 h) (kV/mm) |
|---|---|---|---|
| Inventive formulation 3 | 5 | 88.6 | 48.8 |
| Inventive formulation 4 | 5 | >88.5 | 47.3 |
| Inventive formulation 5 | 5 | >90.1 | 82.1 |
| Inventive formulation 6 | 5 | >90.2 | 59.7 |
| Inventive formulation 6 | 6 | >93.8 | 63.4 |
| Comparative example 3 | 5 | 86.0 | 42.1 |
| Comparative example 4 | 5 | >86.8 | 40.8 |

As can be seen in Table 5, the formulations containing the polar component (Component (ii)) give rise to higher $E_b$ values after 1000 h wet ageing.

It is also worth noting that the model cable that was vulcanised with an increased line speed (inventive formulation 6 with line speed of 6.0/min) also resulted in a higher Eb value after wet ageing. This clearly shows that it is possible to combine improved crosslinking properties, i.e. in this case crosslinking speed, with improved water treeing resistance properties.

The invention claimed is:

1. A crosslinkable polymer composition, comprising
   (i) an unsaturated polyolefin prepared by radical polymerization having a total amount of carbon-carbon double bonds/1000 carbon atoms of more than 0.37 based upon ASTM D3124-72, wherein the base line is drawn from 980 cm$^{-1}$ to around 840 cm$^{-1}$ and the peak heights are determined at around 888 cm$^{-1}$ for vinylidene, around 910 cm$^{-1}$ for vinyl and around 965 cm$^{-1}$ for trans-vinylene, and an amount of units derived from polar comonomer of less than 150 micromoles per gram of unsaturated polyolefin; and
   (ii) a polar copolymer having an amount of units derived from a polar comonomer selected from the group consisting of alkyl acrylates, alkyl methacrylates, vinyl acetate, and mixtures thereof of more than 500 micromoles per gram of polar copolymer, wherein the polar copolymer is prepared by copolymerizing an olefin monomer and a polar comonomer.

2. The polymer composition according to claim 1, wherein the unsaturated polyolefin has a total amount of carbon-carbon double bonds/1000 carbon atoms of at least 0.45 based upon ASTM D3124-72, wherein the base line is drawn from 980 cm$^{-1}$ to around 840 cm$^{-1}$ and the peak heights are determined at around 888 cm$^{-1}$ for vinylidene, around 910 cm$^{-1}$ for vinyl and around 965 cm$^{-1}$ for trans-vinylene.

3. The polymer composition according to claim 1, wherein at least some of the carbon-carbon double bonds are vinyl groups.

4. The polymer composition according to claim 3, wherein the unsaturated polyolefin has a total amount of vinyl groups/1000 carbon atoms of more than 0.11, based upon ASTM D3124-72, wherein the base line is drawn from 980 cm$^{-1}$ to around 840 cm$^{-1}$ and the peak height is determined at around 910 cm$^{-1}$ for vinyl.

5. The polymer composition according to claim 1, wherein the unsaturated polyolefin is prepared by copolymerizing an olefin monomer and at least one polyunsaturated comonomer.

6. The polymer composition according to claim 5, wherein the unsaturated polyolefin has an amount of vinyl groups/1000 carbon atoms which originate from the polyunsaturated comonomer, of at least 0.03 based upon ASTM D3124-72, wherein the base line is drawn from 980 cm$^{-1}$ to around 840 cm$^{-1}$ and the peak height is determined at around 910 cm$^{-1}$ for vinyl.

7. The polymer composition according to claim 5, wherein at least one polyunsaturated comonomer is a diene.

8. The polymer composition according to claim 7, wherein the diene is selected from 1,7-octadiene, 1,9-decadiene, 1,11-dodecadiene, 1,13-tetradecadiene, 7-methyl-1,6-octadiene, 9-methyl-1,8-decadiene, or mixtures thereof.

9. The polymer composition according to claim 7, wherein the diene is selected from siloxanes having the following formula:

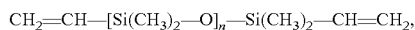

wherein n=1 or higher.

10. The polymer composition according to claim 5, wherein the olefin monomer is ethylene.

11. The polymer composition according to claim 10, the unsaturated polyethylene further comprising units derived from $C_3$ to $C_{20}$ alpha-olefin comonomers.

12. The polymer composition according to claim 1, the unsaturated polyolefin further comprising units derived from a polar comonomer selected from acrylates, methacrylates, vinyl acetate, and mixtures thereof.

13. The polymer composition according to claim 12, wherein the amount of units derived from the polar comonomer is less than 125 micromoles per gram of unsaturated polyolefin.

14. The polymer composition according to claim 1, wherein the olefin monomer is selected from ethylene, $C_3$ to $C_{20}$ alpha-olefins, and mixtures thereof.

15. The polymer composition according to claim 1, wherein the polar copolymer has an amount of units derived from the polar comonomer of more than 700 micromoles per gram of polar copolymer.

16. The polymer composition according to claim 1, the polar copolymer further comprising units derived from a polyunsaturated comonomer.

17. The polymer composition according to claim 1, wherein
   the unsaturated polyolefin is prepared by copolymerizing ethylene with a diene comonomer and optionally a $C_3$ to $C_{20}$ alpha-olefin comonomer and/or a polar comonomer
   the polar copolymer is prepared by copolymerizing ethylene with a polar comonomer and optionally a $C_3$ to $C_{20}$ alpha-olefin comonomer and/or a diene comonomer.

18. The polymer composition according to claim 1, having a total amount of carbon-carbon double bonds/1000 carbon atoms of more than 0.3 based upon ASTM D3124-72, wherein the base line is drawn from 980 cm$^{-1}$ to around 840 cm$^{-1}$ and the peak heights are determined at around 888 cm$^{-1}$ for vinylidene, around 910 cm$^{-1}$ for vinyl and around 965 cm$^{-1}$ for trans-vinylene.

19. The polymer composition according to claim 1, having a total amount of units derived from the polar comonomer of 100 to 800 micromoles per gram of the crosslinkable polymer composition.

20. A crosslinked polymer composition, obtained by treatment of the crosslinkable polymer composition according to claim 1 under crosslinking conditions.

21. The crosslinked polymer composition according to claim 20, having a hot set elongation value of less than 175%, determined according to IEC 60811-2-1.

22. The crosslinked polymer composition according to claim 20, having an electric breakdown strength of at least 45 kV/mm after 1000 h wet ageing at a water bath temperature of 70° C. and a conductor temperature of 85° C. and an electric stress of 9 kV/mm.

23. A process for preparing a crosslinked polymer composition, wherein the crosslinkable polymer composition according to claim 1 is blended with a crosslinking agent, and the blend is treated under crosslinking conditions.

24. A crosslinkable multilayered article, wherein at least one layer comprises the crosslinkable polymer composition according to claim 1.

25. A crosslinked multilayered article, wherein at least one layer comprises the crosslinked polymer composition according to claim 20.

26. The crosslinked multilayered article according to claim 25, which is a power cable.

27. A process for preparing a crosslinked multilayered device, wherein the crosslinkable polymer composition according to claim 1 and a crosslinking agent are applied onto a substrate by extrusion, followed by treatment under crosslinking conditions.

28. The process according to claim 27, wherein the unsaturated polyolefin, the polar copolymer, and one or more antioxidants and the crosslinking agent, optionally in combination with a scorch retarder and/or a crosslinking booster, are blended in a single step, followed by feeding the obtained mixture into the extruder.

29. The process according to claim 27, wherein the crosslinkable polymer composition is blended with one or more antioxidants, optionally in combination with a scorch retarder, followed by blending the obtained mixture with the crosslinking agent, and feeding the final mixture into the extruder.

30. The process according to claim 27, wherein the unsaturated polyolefin and the polar copolymer are melt mixed together with at least one antioxidant, optionally in combination with a scorch retarder and/or a booster; the blend is formed to pellets; and a crosslinking agent and optionally a scorch retarder or a booster are added to the pellets prior to or during extrusion.

31. The process according to claim 27, wherein a melt of the unsaturated polyolefin and the polar copolymer are provided in the extruder, followed by adding antioxidant(s) and crosslinking agent and optionally a scorch retarder and/or further additives in the hopper or to the melt, either simultaneously or in subsequent steps.

32. The polymer composition according to claim 1, wherein the unsaturated polyolefin is produced by high pressure radical polymerization.

* * * * *